United States Patent [19]
Hogberg

[11] Patent Number: 5,240,145
[45] Date of Patent: Aug. 31, 1993

[54] CONTAINER FOR DISPERSING TWO BEVERAGES

[76] Inventor: Martin R. Hogberg, N. 113 Bernard St., Spokane, Wash. 99201

[21] Appl. No.: 925,766

[22] Filed: Aug. 7, 1992

[51] Int. Cl.$^5$ .............................................. B67D 5/60
[52] U.S. Cl. .................................. 222/131; 222/144.5; 222/473; 222/475.1; 222/484
[58] Field of Search ..................... 222/131, 144.5, 472, 222/473, 475.1, 484, 509, 545

[56] References Cited

U.S. PATENT DOCUMENTS

| | | |
|---|---|---|
| 43,154 | 6/1864 | Heneage . |
| 869,702 | 10/1907 | Friend . |
| 1,025,653 | 5/1912 | Sims . |
| 1,518,887 | 12/1924 | Widman . |
| 2,604,233 | 7/1952 | Murphrey . |
| 2,681,743 | 6/1954 | Sung et al. . |
| 4,191,311 | 3/1980 | Auguadro . |
| 4,648,535 | 3/1987 | Zimmermann ...................... 222/472 |
| 4,651,900 | 3/1987 | Horvath et al. . |
| 4,676,411 | 6/1987 | Simasaki ......................... 222/472 X |
| 4,703,871 | 11/1987 | Broker . |
| 4,750,644 | 6/1988 | Kolody . |
| 4,773,563 | 9/1988 | Taylor . |
| 4,809,884 | 3/1989 | Stackhouse ...................... 222/484 X |
| 4,946,079 | 8/1990 | Campbell ............................ 222/484 |
| 5,037,015 | 8/1991 | Collins ................................ 222/472 |
| 5,072,858 | 12/1991 | Brashier ........................ 222/472 X |

FOREIGN PATENT DOCUMENTS 1253615A 8/1986 U.S.S.R. .
1325007 8/1973 United Kingdom .

Primary Examiner—Gregory L. Huson
Attorney, Agent, or Firm—Keith S. Bergman

[57] ABSTRACT

A thermally insulated container for selectively dispersing two beverages provides a vertical cylindrical container, having a diametrically extending septa to define two compartments. The outer surface of the container carries a handle at a first end of the diameter extending through the septa and hingeably supports a cover having a common pouring spout structure defining an orifice at the second end of that diameter. The cover defines two similar depending connector elements to extend in peripheral adjacency within the top portions of each compartment to provide a fluid tight seal between the cover and the container compartments. The cover defines an internal chamber pivotally carrying adjacent operating levers extending from the top and over the handle structure. Each operating lever by motion relative to the container simultaneously opens normally closed first valve means for opening of an input orifice from an associated beverage compartment to the common pouring spout and second valve means for air input into the associated compartment.

3 Claims, 2 Drawing Sheets

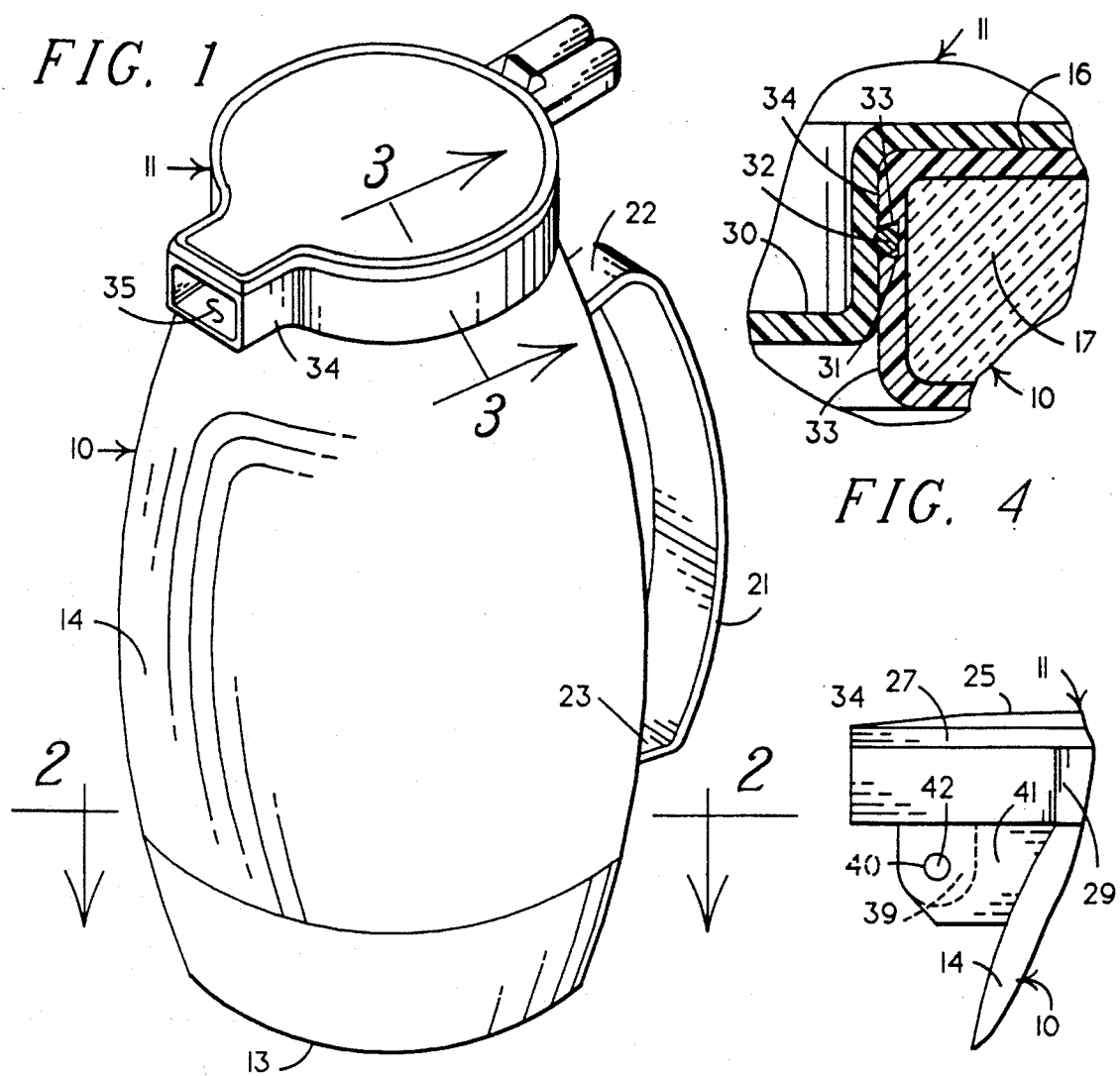
FIG. 1
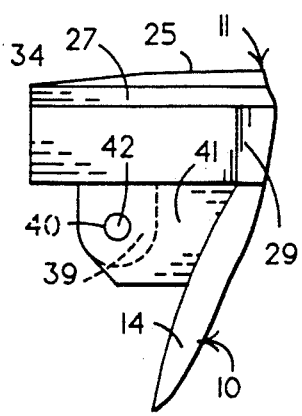
FIG. 4
FIG. 5
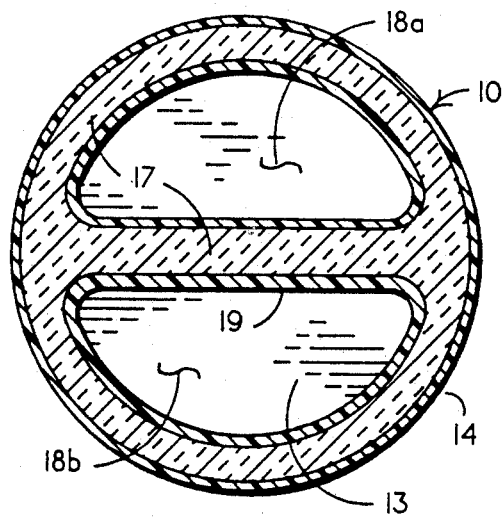
FIG. 2
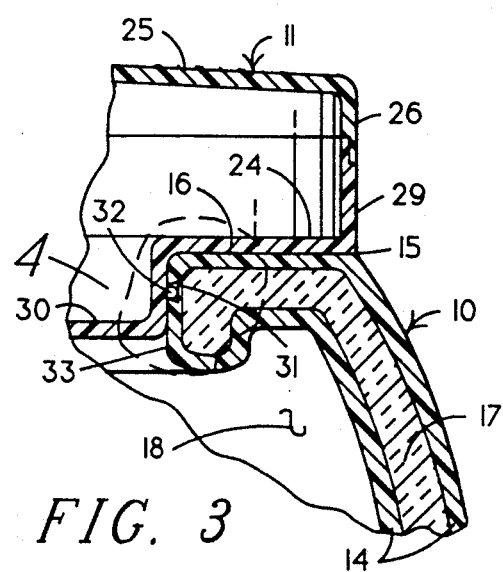
FIG. 3

CONTAINER FOR DISPERSING TWO BEVERAGES

BACKGROUND OF INVENTION

1. Related Applications

There are no applications related hereto heretofore filed in this or any foreign country.

2. Field of Invention

This invention relates generally to containers for selective dispersement of two fluids, and more particularly to such a container that has a cover carrying lever operated valves to selectively disperse fluids from two separate compartments through a common spout.

BACKGROUND AND DESCRIPTION OF PRIOR ART

It is often desirable, especially in the food service industry, to have two different fluidic beverages available simultaneously for selective service. This is especially true in the case of present day coffee service as both ordinary coffee and decaffeinated coffee have substantial popularity and commonly are served simultaneously. This need has been considered in the past and responsively various serving containers for the selective service of two or more beverages have heretofore become known. My invention adds a new, novel and improved member to this type of beverage serving devices.

Most common beverages served with meals are either at, or it is desirable that they be at, a temperature differing from that of the ambient atmosphere. It is therefore desirable that containers for beverage service, wherein beverages are to be maintained for any significant time, provide some means for maintaining the temperature of a contained beverage. This need has been met primarily by providing a container of thin walled construction and with relatively high heat conductivity that is maintained in an appropriate thermal environment during storage or other non-use periods or by providing a container of thicker walled, thermally insulative construction that has a sufficiently low thermal conductivity so that it may be stored for periods of time in areas of different ambient temperature and yet maintain the temperature of contained beverages. The former type of container was more popular in the past and the latter type seems more popular in the present day with the advent of lighter, stronger, and more efficient insulative materials. Both types of containers are presently used, but the insulative type is generally easier and less time consuming of use and has become the most popular type in the competitive food service industry by reason of the economic advantages that it offers. The instant invention provides an insulative type of container and by reason of this, is distinguishable from other multi-beverage dispensing containers that provide a thermally conductive structure intended to be maintained at non use times in a thermal environment other than the ambient one. My server is similarly distinguished from containers that are not concerned at all with maintaining the temperature of a beverage at other value than that of its environs.

For a container that selectively serves two beverages to be commercially viable in the food service industry, it must provide a simple, easy, fast and sure method of selecting a beverage to be served in a particular instance. Prior known containers have either not addressed this problem or have not effectively provided a solution to it. My invention in distinguishment provides valving structure in the bifurcated cover member that is operated by two adjacent horizontal levers, positioned spacedly above an external handle so that the container may be carried in one hand by a server and the beverage to be served selected by depressing the appropriate lever with the thumb of the hand that carries the container. This provides simply activated beverage selection that is sure and certain, as the lever associated with either chamber is on the same side of the medial septum as is that chamber from which dispersement is to be made.

A serving container for commercial use also must provide beverage containment chambers that are simple of configuration and easy of access for filling and cleaning, and the top of the container should be covered to prevent ingress of debris and contaminants and the excessive heat exchange. The cover must be openable and provide a fluid tight seal with the beverage container to prevent spillage, leaking or dripping of fluidic contents. My invention solves these problems by providing a hingeably mounted cover having two depending elements to extend within the top inner peripheral portion of each chamber and allow gasket sealing between the adjacent surfaces to provide a sure water tight seal which is not generally provided by non-gasketed surfaces or by gaskets between substantial horizontal surfaces of a pivotally interconnected cover. This type of cover allows ready access to either compartment of my container for filling, cleaning or the like. This type of cover also allows simple and easy releasable fastening of the cover by a pivotal fastening hook to prevent accidental opening or spillage.

My cover structure provides simple valving and channeling means for dispersing fluid from a single spout to further distinguish it from the prior art. The cover is a peripherally defined structure which has sufficient thickness to define a chamber carrying operating levers, valving structure and a common dispersement spout. Air and fluid orifices for each compartment carry spring biased, lever operated valves that provide a simple and reliable dispersement structure that is substantially enclosed at all times to prevent contamination and damage.

My invention resides not in any one of these features individually, but rather in the synergistic combination of all of its structures that produce the functions necessarily flowing therefrom, as herein specified and claimed.

SUMMARY OF INVENTION

My invention generally provides a peripherally defined, thermally insulated beverage container for selective dispersement of two beverages. The container provides a diametrically extending septa defining two containment compartments, with a handle on the exterior surface outwardly adjacent a first end of the septa. An openable cover is hingeably mounted on the upper portion of the container top and provides a cam type lock that allows selective fastening to the container structure. The cover defines two depending connector elements that extend into the upper portion of each compartment for sealable interconnection about the periphery thereof and an internal chamber carrying valving mechanism and a common spout structure above the second end of the septa. Each connector element carries a normally closed disbursement valving mechanism and air input valving mechanism, both operable by a horizontal lever extending a spaced distance outwardly above the upper portion of the vertical handle.

In providing such a beverage container, it is:

A principal object to provide a thermally insulated container defining two compartments to allow selective dispersement of two beverages.

A further object is to provide such a container that has a selectively openable cover providing access channels for air and fluid from each compartment to a common spout for dispersement.

A further object is to provide such a cover that has valving mechanisms to regulate an input and fluid dispersement from each compartment.

A further object is to provide such valving mechanisms that have lever operating means extending spacedly above a vertically handle to allow one handed use.

A still further object is to provide such a container that is of new and novel design, of rugged and durable nature, of simple and economic manufacture and otherwise well suited to the uses and purposes for which it is intended.

Other and further objects of my invention will appear from the following specification and accompanying drawings which form a part hereof. In carrying out those objects, however, it is to be understood that its accidental features are susceptible of change in design and structural arrangement with only one preferred and practical embodiment of the best known mode being illustrated in the accompanying drawings, as is required.

BRIEF DESCRIPTION OF DRAWINGS

In the accompanying drawings which form a part hereof and wherein like numbers refer to similar parts throughout:

FIG. 1 is an isometric side view of my container showing various of its parts, their configuration and relationship.

FIG. 2 is a horizontal cross-sectional view through the container of FIG. 1, taken on the line 2—2 thereon is the direction indicated by the arrows thereon.

FIG. 3 is a partial vertical cross-sectional view through the upper portion of the cover and container of FIG. 1, taken on the line 3—3 thereon in the direction indicated by the arrows.

FIG. 4 is an enlarged portion of FIG. 3 shown by dashed line 4 to show more clearly the gasket structure of my container.

FIG. 5 is a partial orthographic side view of the spout structure, showing particularly the pivotal mounting of the top.

DESCRIPTION OF THE PREFERRED EMBODIMENT

Figure 7:
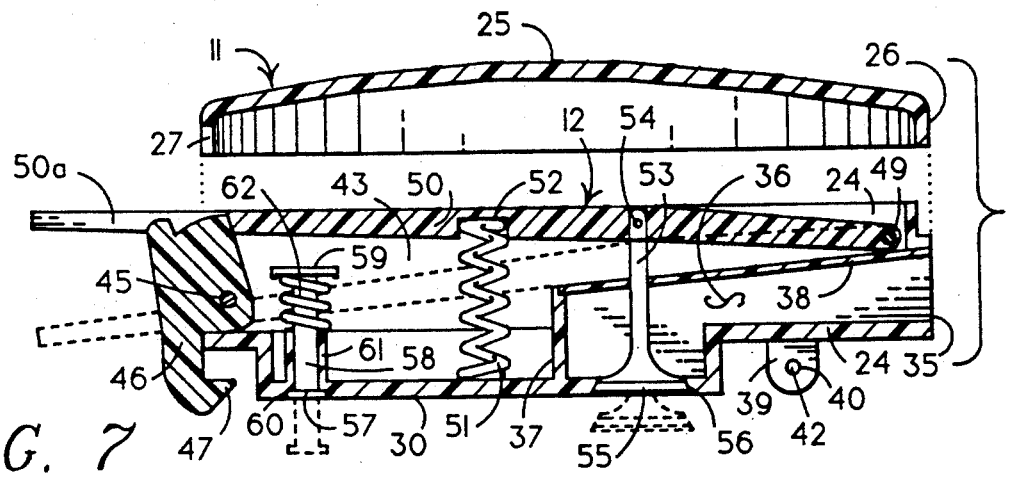
FIG. 7 is a vertical broken cross-sectional view of the structure of FIG. 6 and the adjacent cover cap, taken on the line 7—7 thereon in the direction indicated by the arrows thereon.

My invention generally provides a beverage container having body 10 hingeably carrying cover 11 which embodies valving mechanism 12 to allow selective dispersement of beverages contained in two chambers defined in the body.

Container body 10 provides a pitcher like structure having bottom 13 structurally communicating with upstanding peripheral wall 14 terminating in uppermost edge 15 and flat planar top 16. In the instance illustrated the body comprises a surface of revolution because of the ease of formation of this type of container and its aesthetic appeal, though it may comprise various other similar symmetrical or asymmetrical configurations and remain within the ambit of my invention so long as it serves as a container. The size of the body is not critical, but commonly for convenience the body will be ten to twelve inches tall with bottom and top portions having a diameter of approximately six inches and the medial portion having a diameter somewhat greater to provide a truncated prolate configuration that encloses a chamber having a volume of two to three fluidic quarts. The parameters set forth are generally most desirable for maximum convenience of use and efficiency as commercial serving containers but are not intended to be limitations.

The walls of the body should not have high thermal conductivity and in my container, this is accomplished by providing a relatively thick wall structure of a compound nature defining an enclosed medial chamber carrying insulative material 17. The exposed surfaces of body 10 are formed of a reasonably rigid, non-porous material to effectively contain either heated or chilled beverage products without contamination such as from one of the food grade polymeric or resinous plastics. These materials are readily formable, have lower thermal conductivity and generally do not contaminate beverage products or aid their contamination. The insulative material 17 preferably is a foamed polymeric material such as foamed polystyrene commonly used for thermal insulative purposes. Such insulative material is completely enclosed by the body material so it may be porous and its chemical constituency is not particularly material in relation to contained food products. The inner surface of the container body that defines its containment compartments may be coated with a thermally reflective material (not shown), such as a polished metal coating, as heretofore known in the food service arts to aid in preventing transmission of radiant heat to provide additional insulative properties.

Internal chamber 18 defined by container body 10 is divided into two subchambers 18a and 18b by medial septum 19. This septum 19 is positioned so that it extends from the upper surface of bottom 13 to the top of the container, with its vertically medial portion substantially along a diameter of container body 10 and its upper edge coplanar with upper surface 16 of the container. The septum 19 is formed with an insulative construction similar to that of the sidewalls of the container with medial insulation 17, though the thermal nature of the material from which the septum is formed may not be critical if the container contains two fluids of a similar temperature.

The upper portion of body 10 defining the upper orifices communicating to each container compartment are substantially vertical, as illustrated in FIGS. 3 and 4, and define gasket groove 31 to receive continuous gasket 32 of substantially cylindrical cross-sectional shape to fit against the adjacent surface of a cover element. Gasket groove 31 has upper and lower surfaces diverging somewhat in an inward direction and an inward surface so positioned as to cause the cylindrical gasket to project slightly beyond the vertical surface 34 defining the groove orifice. This groove allows the gasket, when deformed, to expand within the inner portions of the groove to provide a better fit with an adjacent member that is easily established and released.

The external surface of container side wall 14 structurally supports spacedly adjacent, vertically extending handle 21 having upper horizontal connecting portion 22 and lower horizontal connecting portion 23. Handle 21 is positioned so that its vertically medial portion is substantially on a diametrical plane extending through the medial portion of septum 19, and the upper horizontal connecting portion 22 is spacedly below top surface 16 of the container body to allow one-handed holding of the container with simultaneous manipulation of operating levers spacedly thereabove.

Cover 11 provides base 24 supporting peripherally defined top 25 which has depending peripheral skirt 26 for supportive interconnection on the base. The skirt 26 defines orifice 27 in its rearward portion to allow passage of operating levers therethrough.

Cover base 24 provides planar bottom element 24 supporting upstanding arcuate peripheral side 29. The bottom element in its medial portion defines two similar paired opposed connecting elements 30 that depend into the upper portions of the two compartments of the container. The connecting portions are so configured that they fit in substantial adjacency with the upper peripheral portions of those compartments to cooperate with gaskets structures to provide a water-tight seal. The vertical depth of the interconnection between the connecting portions 30 and adjacent portions of the container body is not critical, but should be sufficient to allow positioning of the gasket structure therebetween and provide an appropriate water-tight fit between the adjacent surfaces.

The forward portion of cover base 24 defines spout 34 projecting spacedly forwardly thereof. The spout is positioned to extend forwardly of the forward end of septum 19 and defines pouring orifice 35. The spout illustrated is of a rectilinear configuration and this is preferred but not necessary to my invention. A fluid dispersement channel 36 is defined with the lower forward portion of base 24 to extend from above the forward portion of each depending connecting portion 30 to pouring orifice 35. As seen in FIG. 7, the dispersement channel is formed by upstanding vertical rearward wall 37 communicating with planar top 38 which, in cooperation with the bottom portion of the cover structure, define channel 36.

Figure 6:
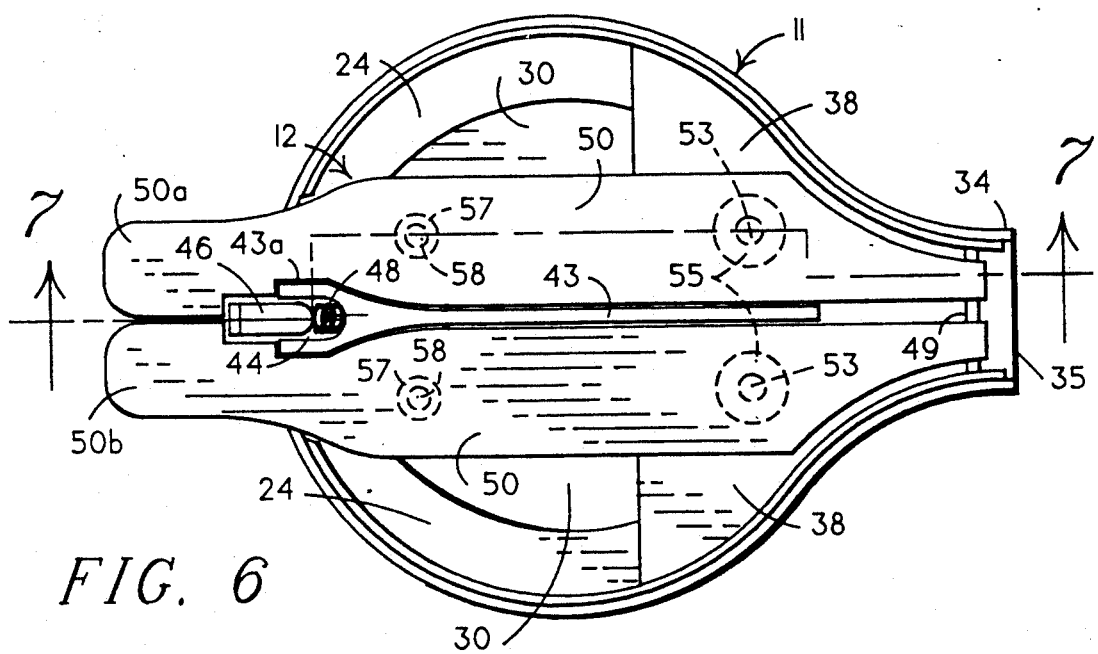
FIG. 6 is an orthographic view of the cover with the top cap portion removed to show internal structure.
Figure 8:
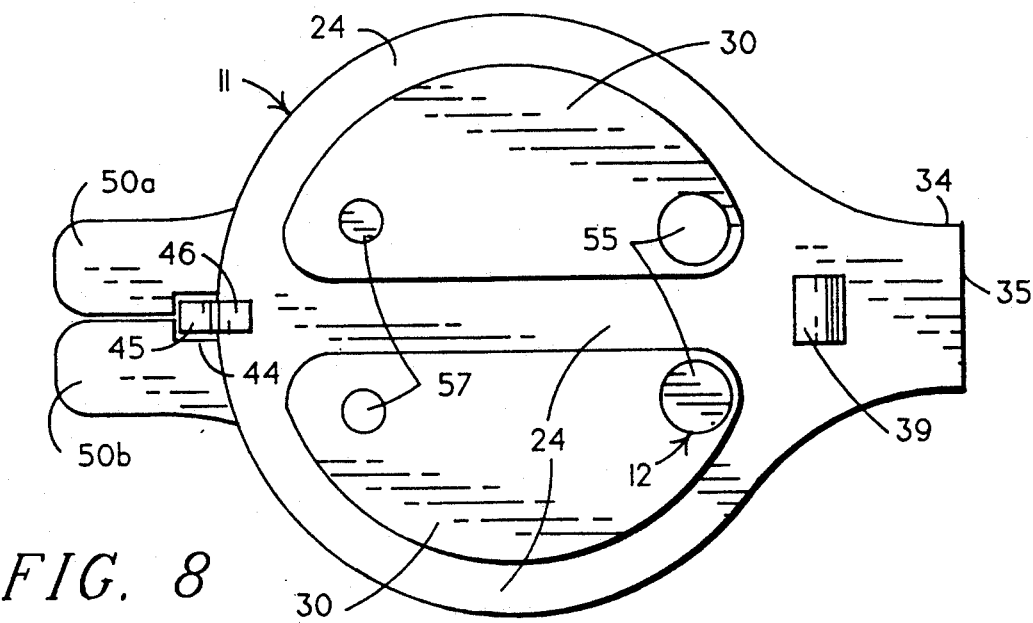
FIG. 8 is an upwardly looking view of the bottom of the cover.

The forward portion of bottom 24, spacedly forwardly of connecting portions 30, carries depending connecting arm 39 defining medial axle hole 40. As seen in FIG. 6, this connecting arm 39 fits between paired opposed cover fastening dogs 41 carried by the upper forward portion of body side wall 14. The fastening dogs 41 define medial axle channel to cooperate with similar channels 40 of the top connecting arm to carry mounting axle 42 extending therebetween to pivotally interconnect the top and body.

The medial rearward portion of base 24 supports upstanding wall 43 at a position vertically above body septum 19. This cover wall 43 in its rearward portion widens laterally to define latch channel 44 as seen in FIG. 6. The divided rearward portions 43a of the cover wall 43 define opposed holes to receive pin 45 to pivotally mount catch 46 with its forward portion in the latch channel. The catch 46 extends rearwardly of the rearward extension of cover 11 to allow manual access to its upper portion and defines lower fastening hook 47 that is selectively engaged within a cooperating notch defined in the upper rearward portion of body 10 to releasably fasten the cover in covering position on body 10. The catch is maintained in a biased latching condition by compression spring 48 extending between the upper forward portions of the catch and the forward surface defining catch channel 44.

Valvin mechanism 12 provides operating and valving structure carried within the chamber defined in cover base 24. Spout portion 34 of the base, spacedly inwardly of pouring orifice 35, carries operating lever pin 49 extending through spaced opposed holes defined through opposed upstanding peripheral sides 29. Two similar operating levers 50 that are mirror images of each other are pivotally carried in their forward portions on pin 49 to extend rearwardly on each side of wall 43 to a spaced distance rearwardly of cover 11 and over the upper portion of handle 22. The operating levers are biased to an upward, substantially horizontal position illustrated in FIG. 7 by medial compression springs 51 extending from spring notches 52 defined in the lower portion of each operating lever to the upper surface of connecting portions 30 of the cover thereberneath. The medial portion of each operating lever, forwardly of spring 51, pivotally carries the upper end of valve stem 53 by means of valve pin 54 extending between the valve stem and operating lever. This valve stem carries depending valve 55 seated in valve orifice 56 defined in the lower surface of each connecting portion 30 in that portion of the surface communicating with dispersement channel 36. With this structure as either operating lever 50 is depressed in its rearward portion, the associated valve 55 will be moved downwardly to open orifice 56 to create a passage from the associated compartment into the dispersement channel 36.

The rearward part of each connecting portion 30 carries an air input valve 57 having upstanding valve stem 58, with stop disk 59 at its upper end which is beneath the associated operating lever when that lever is in its normal relaxed position. The bottom of each connecting portion 30 defines an input hole 60 to accept valve 57 in a sealable fit. An upstanding tubular cylinder 61 a spaced distance extends upwardly from the periphery of valving hole 60 to slidably support the valve stem. Compression spring 62 is carried about the upper portion of valve stem 58 to bias the valve to an upward closed position, but the upper disk 59 is movable downwardly by downward motion of associated operating lever 50 to open the air input valve simultaneously with fluid output valve 55.

Having thusly described the structure of my invention, its use may be understood.

Firstly, a container of appropriate size and configuration is constructed according to the foregoing specifications and assembled with the cover 11 in place on body 10.

To fill the container with fluids, the upper rearward portion of catch 46 is manually moved forwardly to release hook structure 47 from engagement with the body and the rearward portion of the cover is then pivotally raised to an opened condition. Access then may be had to the upper orifices of the compartments therebeneath for filling or other operations such as cleaning. The compartments are filled with beverages to be dispersed and cover 11 is then pivoted back into its normal covering position upwardly adjacent the top of the container structure and with its connecting portions 30 sealably extending into the upper portion of each compartment. The latch element 46 is then moved to its original fastening position, with hook structure 47 in fastening engagement with body 10. In accomplishing this fastening, the resiliently deformable gasket 32 will be somewhat deformed into its groove 31 so that its surface adjacent the vertical wall of connecting portions 30 will sealably engage that surface in a liquid tight seal.

To use the container, handle 21 is grasped in its upper part by one hand of a user, normally by the fingers of the principal hand, and the thumb of that hand is positioned so that it may extend over the rearward end portion 50a of either operating lever 50. When one liquid is to be dispersed, the operating lever on the side of the container depressed by the thumb of the user's hand that is holding the handle. This moves both air input valve and disbursement valve thereunder downwardly to open both valves and air valve associated with that subchamber. The container is then tipped forwardly so that pouring spout 24 moves downwardly below the level of fluid in the open compartment to disperse that fluid by gravity from the container in normal pouring fashion. When pouring is to be terminated, the depressed operating lever is released and its spring bias will move it upwardly to close both air valve 57 and dispersement valve 55, and the container is moved to a vertical position to remove fluid pressure from the valving orifices.

In this pouring operation, it is to be noted that as the upper portion of the container is tipped downwardly, fluid will be moved toward the upper forward portion of the subchambers, but that liquid may not pass out of the subchamber except through an open dispersement valve, and then only into dispersement chamber 36. The air valve in the forward portion of the cap will be at a higher elevation than the dispersement valve and will not have fluid present at its orifice that may pass through it so no fluid will pass into the chamber 43 defined in the cap structure. The air valve is desirable to allow entry of the ambient atmosphere to prevent the formation of a partial vacuum in the containment compartments and thus allow a smooth continuous pouring of fluid without possible interruptions that might be caused if only air input to the subchamber were through dispersement channel 36.

The foregoing description of my invention is necessarily of a detailed nature so that specific embodiment of it might be set forth as required, but it is to be understood that various modifications of detail, rearrangement and multiplication of parts might be resorted to without departing from its spirit, essence or scope.

Having thusly described my invention, what desire to protect by Letters Patent, and
What claim is:

1. A container for selectively dispersing either of two fluids comprising:
   a body having two compartments defined by a medial septum, the body having a planar top, a handle, and the surface defining the upper portion of each compartment being substantially vertical;
   a pivotally openable cover carried by the upper portion of the body, said cover having depending fastening portions extending into sealable communication with the upper portion of each compartment and defining a spout communicating with a pouring channel having dispersement and air input orifices communicating with each compartment;
   valving mechanism carried by the cover comprising two elongate selecting levers extending from the cover for manipulation, each lever operatively communicating with normally closed valve means associated with each dispersement orifice and air intake orifice that communicate with one compartment to open both said valve means responsive to selecting lever motion to allow selective disbursement of fluid carried in either compartment through the spout.

2. A thermally insulated container for selectively dispersing one of two beverages, comprising in combination:
   a peripherally defined rigid body having a bottom structurally communicating with an upstanding side wall terminating in a planar upper surface, said container defining an internal containment chamber divided into two compartments by a vertical septum extending diametrically between opposed side walls of the body, the upper surface of the septum being coplanar with the upper surface of the container, and the surfaces defining the upper portion of the side walls of the compartments being substantially vertical for a spaced distance below the upper surface of the compartments,
   a vertically extending handle carried by the container outwardly adjacent the rearward first vertical edge of said septum, the handle having an upper portion spacedly below the container top,
   gasket sealing means communicating between the upper vertical portion of the surfaces defining each compartment and cover portions adjacent thereto, and
   fastening means carried by the body to releasably fasten a cover in covering position; a pivotally openable, peripherally defined cover having
   hinge means for mounting the cover on the upper portion of the body to position the cover in interconnecting adjacency with the body,
   fastening means cooperating with the fastening means of the body to maintain the cover in covering position and allow selective opening,
   depending connecting portions having vertical side walls to sealably fit within the upper orifice of each compartment, and
   a spout defined in the cover outwardly adjacent the second forward vertical edge of the septum, said spout communicating with a pouring channel defined in the cover to communication with the upper portions of each compartment; and
   selecting mechanism carried by the cover providing
      fluid dispersement valves carried in valve orifices defined in the forward portion of the cover and compartment communicating between each compartment and the pouring channel,
      air intake valves carried in orifices defined in the rearward portion of the cover and communicating with each compartment,
      adjacent pivotally mounted operating levers, each extending over the air intake valve and fluid dispersement valve communicating with one compartment and rearwardly from the cover over the upper portion of the handle to open said valves responsive to lever motion, and
      means to bias the fluid dispersement and air intake valves to a normally closed condition.

3. The apparatus of claim 2 wherein at least the side wall and bottom of the body define a medial chamber containing thermal insulating material to lessen thermal conductivity through said side wall and bottom.

* * * * *